US009104877B1

(12) United States Patent  
Allen

(10) Patent No.: US 9,104,877 B1  
(45) Date of Patent: Aug. 11, 2015

(54) DETECTING PENETRATION ATTEMPTS USING LOG-SENSITIVE FUZZING

(71) Applicant: Amazon Technologies, Inc., Reno, NV (US)

(72) Inventor: Nicholas Alexander Allen, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 14 days.

(21) Appl. No.: 13/966,749

(22) Filed: Aug. 14, 2013

(51) Int. Cl.
*G06F 21/57* (2013.01)
*G06F 11/30* (2006.01)

(52) U.S. Cl.
CPC .......... *G06F 21/577* (2013.01); *G06F 11/3065* (2013.01)

(58) Field of Classification Search
CPC ...................... G06F 21/577; G06F 11/3065
USPC ............................................................ 726/25
See application file for complete search history.

(56) References Cited

U.S. PATENT DOCUMENTS

| | | | | |
|---|---|---|---|---|
| 7,801,840 B2* | 9/2010 | Repasi et al. | ................... | 706/52 |
| 2009/0150374 A1* | 6/2009 | Dewey et al. | ...................... | 707/5 |
| 2011/0208714 A1* | 8/2011 | Soukal et al. | .................. | 707/709 |
| 2011/0283360 A1* | 11/2011 | Abadi et al. | ..................... | 726/24 |
| 2011/0302455 A1* | 12/2011 | Thomas et al. | .................. | 714/45 |
| 2012/0072968 A1* | 3/2012 | Wysopal et al. | .................... | 726/1 |
| 2013/0340083 A1* | 12/2013 | Petrica et al. | .................... | 726/25 |
| 2014/0082735 A1* | 3/2014 | Beskrovny et al. | ............. | 726/25 |
| 2014/0082737 A1* | 3/2014 | Beskrovny et al. | ............. | 726/25 |

OTHER PUBLICATIONS

Antunes, Nuno et al., "Detecting SQL Injection Vulnerabilities in Web Services," 2009 Fourth Latin-American Symposium on Dependable Computing, pp. 17-24.*

* cited by examiner

*Primary Examiner* — Michael Pyzocha
(74) *Attorney, Agent, or Firm* — Weaver Austin Villeneuve & Sampson

(57) ABSTRACT

Techniques and systems are provided for detecting penetration attempts with fuzzing techniques utilizing historical log data of target system. The techniques may, for example, include comparing logs captured in response to fuzzed inputs with large numbers of historical logs and then modifying how the inputs are fuzzed based on how the fuzzed inputs resulting in a high similarity score were fuzzed. In some implementations, historical logs and captured logs with high similarity scores may cause an alarm condition to be triggered to alert a human operator.

23 Claims, 7 Drawing Sheets

DETECTING PENETRATION ATTEMPTS USING LOG-SENSITIVE FUZZING

BACKGROUND

It is increasingly common for digital resources to be made available to consumers, customers, or users via network connections, e.g., via the Internet or via large-scale intranets. Such digital resources may take many forms, including web sites, on-line databases, web services, digital streaming sites, etc.

In many cases, such digital resources may be provided over a network in response to a request made of the computing system that manages the digital resources. For example, a computing system that provides content to remote users may, in response to an HTTP request received from a remote computer, respond by providing a copy of a webpage to the remote computer. In another example, a computing system that provides on-line database access may provide a recordset to a remote computer responsive to an access request from a remote computer coupled with a structured query language (SQL) query from the remote computer. In yet another example, a computing system may provide storage resources to remote clients and may provide access to files stored on the storage resources in response to an access request received from a remote client.

The ways in which computing systems may be used to provide resources responsive to requests received over a network connection are many and varied, but such systems do share some common traits. First, such systems commonly "listen" for requests that are directed towards a designated network address or addresses, parse the requests into one or more system inputs, and, based on the system inputs, provide (or not provide) a response to the requesting entity.

Second, such systems are often subjected to constant attack by entities with malicious intent. Computing system operators must constantly guard against such malicious entities by addressing newly-discovered vulnerabilities.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
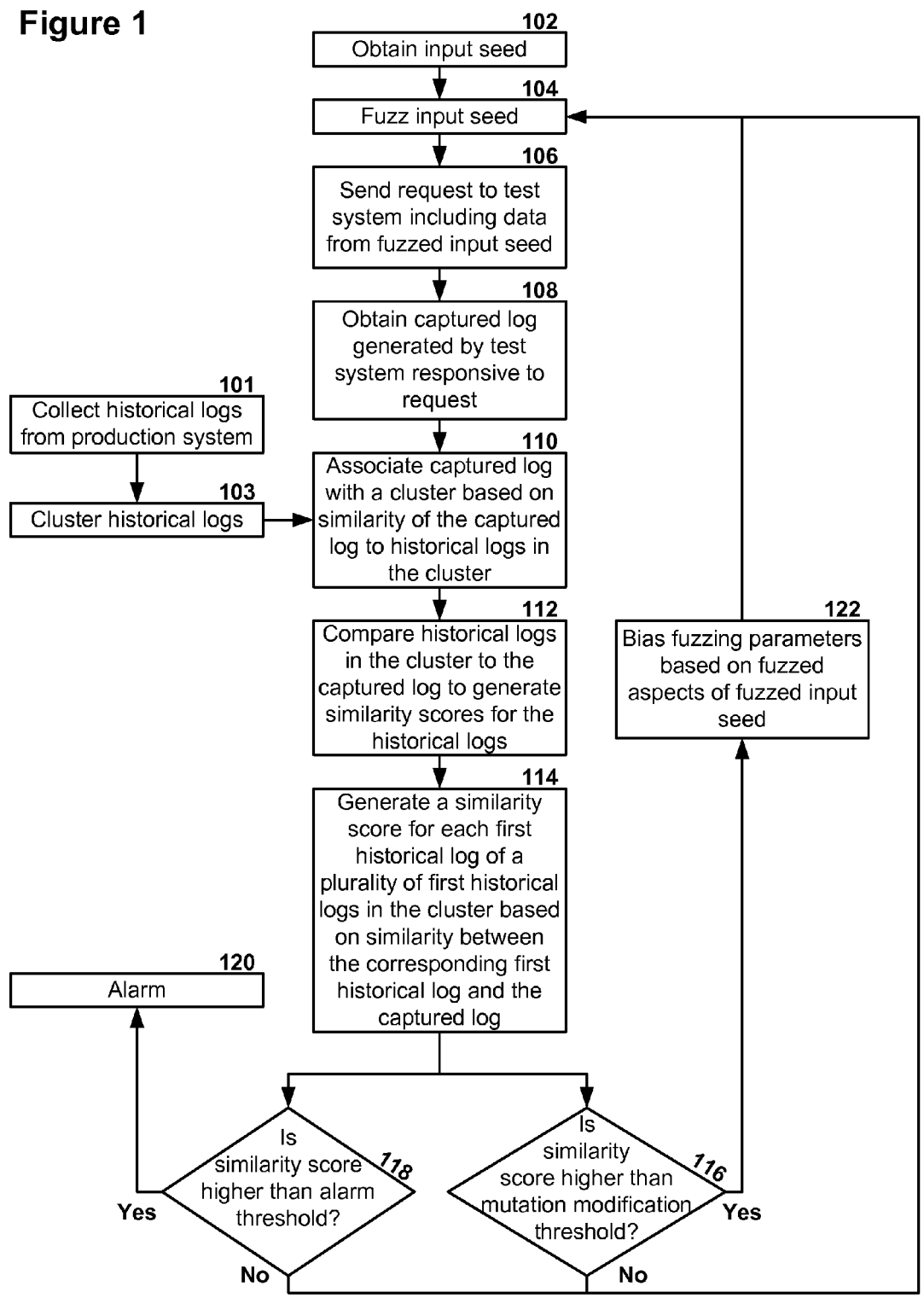
FIG. 1 depicts a flow chart of a log-sensitive fuzzing technique.

As discussed above, computing systems used to provide digital resources to entities over a network connection may be subject to constant attack by malicious entities. Such malicious entities may attempt to gain access to, or manipulate the output of, computing systems by making requests of the computing system that attempt to exploit a vulnerability. For example, one common method of attacking computing systems used to provide data products is to attempt an SQL injection attack by inserting SQL command snippets into a parameterized query field in order to modify the underlying query structure and thus the behavior of the computing system executing the query.

Generally speaking, computing systems are usually in one of three states from a security perspective. In the first state, the computing system may be completely safe from attack, i.e., the computing system is either not under attack or is only under attack by entities seeking to exploit a past security vulnerability that has already been neutralized by the computing system operator.

In the second state, the computing system may be under attack by an entity exploiting a security vulnerability that, while unhandled, is known to the computing system operator and that the computing system operator is seeking to address.

In the third state, however, the computing system may be under attack by an entity using a new vulnerability or seeking to discover a new vulnerability and the computing system operator may be generally unaware of such efforts.

Of the three states, the third state is possibly most worrisome to computing system operators since a vulnerability of which they are unaware may, if discovered by malicious entities, be exploited without the computing system operator's knowledge.

One technique that may be used by computing system operators to reduce the risk of exposure in the third state is to attempt to discover potential vulnerabilities before they are discovered and exploited by malicious entities. To that end, a computing system operator may "step into" the shoes of a malicious entity and launch a series of attacks against the system. The computing system operator may then monitor the responses provided to the requesting system in response to the request, or the overall state of the computing system, e.g., whether or not the computing system has crashed in response to a request, to evaluate if the requesting system has gained an undesirable level of access in response to one of the requests or caused an undesirable result in the computing system. In essence, the computing system operator is performing a brute-force attack against the computing system in an attempt to expose a potential vulnerability.

Such "brute force" techniques generally rely on the automated generation and application of large numbers of test inputs, e.g., randomly mutated inputs that are provided to the computing system as requests in an effort to provoke the computing system to provide an undesirable response to the requesting system (or to "break" in some other unhandled manner, e.g., cause a memory leak detectable with a memory debugger). The use of such techniques may generally be referred to as "security fuzzing" within the industry.

From a practical standpoint, it is important to note that security techniques such as the security fuzzing described above, as well as the techniques outlined later herein, are inseparably tied to real-world computing devices.

First, such techniques are used to explore potential vulnerabilities in actual computing systems, i.e., actual physical hardware such as processors, memory, communications interfaces, etc., that are specifically configured, e.g., via computer-executable instructions, to provide digital resources to remote entities or their designates in response to requests from those remote entities. In the absence of such an actual computing system, such techniques provide no value.

Second, such techniques also cannot, as a practical matter, be implemented without a computing system to serve as the simulated attacker of the subject computing system (hereinafter "computing system"). There are several reasons for this. For example, the computing system must be provided with requests representing fuzzed inputs—such requests must be provided to the computing system using standard communications protocols that the computing system will recognize and respond to, i.e., requests delivered via a communication path recognized by the computing system, e.g., via a network connection, and formatted in a manner that the computing system will accept. Such requests thus must be transmitted to the computing system via some connection provided by some form of hardware, e.g., via a wired network interface card or wireless network interface.

Furthermore, in order to provide any statistically significant degree of confidence that vulnerabilities susceptible to being detected using security fuzzing will actually be detected, vast quantities of fuzzed inputs may need to be generated for a computing system, e.g., on the order of thousands, millions, billions, etc. of fuzzed inputs for more complex systems. Fuzzed input generation on such a scale is simply beyond the capabilities of the human mind, and in order to allow such techniques to be practiced in anywhere near a commercially acceptable timeframe, such quantities of fuzzed inputs may need to be generated and provided within the span of hours or days.

While the above discussion has described security fuzzing as being of assistance in identifying existing vulnerabilities unknown to the computing system operator, the present inventor has realized that a new fuzzing technique as outlined herein may be of use in detecting attempts by malicious entities to find such vulnerabilities without the computing system operator necessarily being aware of what the vulnerabilities are prior to detection.

FIG. 1 depicts a flow chart of a log-sensitive fuzzing technique. In block 101, historical logs are collected from a production system. The historical logs may be produced as part of normal operation of the production system, and may include, for example, access logs, exception logs, audit logs, and other, similar log types. Generally speaking, logs (historical or otherwise) are generally files that document various categories of system events that may prove useful for auditing, troubleshooting, or other purposes. Logs are typically stored in one or more repositories for later reference, and may be maintained indefinitely or for various periods of time. One or more logs may be generated as part of a production system's response to a request received by the production system by an external entity. While such logs may include data that are passed to an external entity making a request of the production system, the logs themselves are not normally provided to the external entity since (a) non-malicious external entities may be largely uninterested in the actions performed by the production system in response to a request and separating the "log" elements from the data of interest in the response may introduce an undesired level of complexity to the interactions between the external entity and the production system, and (b) malicious external entities might use information in the logs to gain insight into how the production system works, thus making them more able to effectively attack the production system.

In block 103, the collected historical logs may be clustered into a plurality of clusters based on similarities between the logs. Such clustering may utilize any of a variety of clustering techniques known in the art, e.g., k-center (k-means) clustering, expectation-maximization, hierarchical clustering, etc., or combinations thereof, e.g., expectation-maximization clustering followed by k-center clustering, to group the historical logs into distinct clusters based on the similarities of the logs.

As part of this clustering, the historical logs may be parsed to determine information describing various events to which the historical logs pertain. For example, the historical logs may be parsed to determine an event description/text, event timestamp, session identifier, etc., all of which may be stored in an event record. It is to be understood that, in the context of this application, a historical log and the event record that may be parsed from the historical log may generally be used interchangeably. Thus, the historical logs may be clustered based on a clustering analysis performed directly on the historical logs or based on the event records parsed from the historical logs.

The historical log clustering may cluster the historical logs based on a metric indicating the degree of similarity between historical logs based on the edit distance between historical logs (or between, for example, event descriptions/texts). The edit distance may indicate the number of operations required to transform one historical log into another historical log, although there are many different edit distance techniques that may be used as appropriate. For example, the log clustering may cluster events by performing k-center clustering using a distance metric based at least in part on the edit distance between the event texts of the historical logs. Other clustering techniques may utilize other metrics besides, or in addition to, edit distance to cluster the historical records. In many clustering techniques, the historical logs may be compared against one or more representative historical logs associated with each cluster, e.g., actual historical logs deemed as being within such clusters and/or hypothetical historical logs associated with each cluster. For example, hypothetical logs may be generated that include some elements that are produced by combining elements from a plurality of different, actual historical logs in various ways. In some cases, the representative historical logs for a cluster may include both hypothetical and actual historical logs.

The historical log clustering may ignore various aspects of the historical logs that are expected to vary, e.g., timestamps, session identifiers, etc., but that generally do not, by themselves, indicate that two historical logs are different. For example, in the four example logs listed below, all of the information to the left of the terms "access" or "exception" pertains to the timestamp of the logs and may be expected to vary considerably from historical log to historical log. The historical log clustering may ignore such portions of historical logs since they do not impact structural conformance of the historical logs to the structures of the one or more representative historical logs associated with the cluster.

Date: 06-02-2013, time: 13:31:42, access attempt by: n.allen, result: invalid password
Date: 06-03-2013, time: 08:43:53, exception: non-existent file request, filename: 124002.jpg
Date: 06-04-2013, time: 11:35:41, access attempt by: p.allen, result: invalid password
Date: 06-04-2013, time: 17:03:02, exception: null parameter passed, parameter: m_date Historical log clustering may primarily be of use in large datasets of historical logs, e.g., as a way of separating out smaller subsets of related historical logs from an otherwise massive dataset. Some production systems may process millions of requests per hour and each such request may generate one or more historical logs responsive to the request. As a result, there may easily be billions or trillions of historical logs generated within a relatively short timeframe, e.g., weeks or months, of production system operation. By clustering the historical logs into smaller groups, the time required to perform other phases of the technique as described further below may be drastically reduced.

If computational resources exist that allow the technique to be practiced in a satisfactorily rapid enough manner absent the clustering of historical logs, the historical log clustering (and later technique steps related to the clustering) may be omitted.

In block 102, an input seed for the production system may be obtained. The input seed may be a string, dataset, or other information that serves as an example of the type of information that may be provided to the production system in order to provoke a response from the production system. Such input seeds may, in many cases, be obtained from the developer of the production system or from functional specifications that indicate the allowable structure and format of a request made to the production system. In some implementations, the input seed may be crafted such that it bears a resemblance to an input seed associated with a known malicious request. For example, an input seed or input seeds may be based on a known cross-site scripting attack or structured query language (SQL) injection attack.

In block 104, the input seed may be fuzzed to generate a fuzzed input seed. To generate the fuzzed input seed, one or more aspects of the input seed may be randomly mutated to produce a fuzzed input seed that is different from the input seed. Such mutation may, for example, modify the input seed by replacing random characters or words in a portion of the input seed with other characters or words (or by adding or removing random characters or words to a portion of the input seed). Such mutation may result in fuzzed input seeds that are atypical with respect to inputs received by the production system during normal use, and may violate input formatting rules associated with use of the production system. For example, if a production system expects input in the form of a fixed-length string, a fuzzed input seed may provide a string with a greater length. In another example, if a production system expects an input in the form of an escaped character string, the fuzzed input seed may provide an unescaped character string. Single or multiple individual mutations may be performed on an input seed to provide a fuzzed input seed.

In some implementations, the fuzzing may not take into account any results of the technique, although in other implementations, the fuzzing may be modified or biased according to results of the technique. Such modified fuzzing is discussed in more detail later in this disclosure.

In block 106, a request may be sent to a test system including data from the fuzzed input seed. The test system may, in some implementations, be the production system, i.e., the production system may be used in both its normal capacity and as a test platform. In other implementations, the test system may be separate from the production system (although the test system and the production system may still utilize common resources, e.g., data sources). In implementations where the test system and the production system are separate systems, the test system may substantially replicate the functionality and behavior of the production system (in implementations where the test system is the production system, then there is no need to replicate the functionality and behavior of the production system in the test system since the production system, of course, already has such characteristics). In some such separate test/production system implementations, the test system may simply be another instance of the production system that is executed under controlled conditions. Frequently, a test system may be isolated from untrusted entities, e.g., be in a contained, isolated environment that prevents undesired stimuli from affecting the test system.

The request may be formatted in a manner that causes the test system to attempt to process the request as the test system would with any other request. In some implementations, a variety of different drivers or request packagers may be written to convert or package fuzzed input seeds into requests formatted for different test systems, allowing the technique outlined herein to be used to analyze different test/production systems with a low degree of modification to programming related to seed input fuzzing. In some implementations, the input seeds may already be in the form of a request and may not need subsequent conversion or packaging into a request.

In some implementations, the request may actually be multiple requests that are part of an overall test pattern. As used herein, a "request," with respect to an attack, is to be understood to refer to single requests as well as multiple requests that may be part of a test pattern. Additionally, an "input seed" may refer to a single input seed, or a collection of input seeds, used to generate a fuzzed seed (or fuzzed input seeds) that provide data used in a request (or requests) for a test pattern. It is also to be understood that while the techniques described herein are typically described with reference to a single input seed, these same techniques may be practiced with multiple different input seeds in order to explore different potential input seed spaces.

In block 108, a captured log file may be obtained from the test system. The captured log file may be generated by the test system as a result of the test system's treatment of the request. For example, if the request involves a request to grant some level of data access permission to a particular user for resources managed by the test system, the test system may generate an access log that may be captured. The captured log files may be associated with the request and/or the fuzzed input seed(s) that resulted in the captured log files' generation.

It is to be understood that one request may generate multiple logs, and that block 108 further contemplates capturing logs in addition to the captured log. In general, each captured log generated responsive to a request may be handled per the technique described herein with respect to a single captured log.

In block 110, the captured log may be associated with a cluster of historical logs resulting from the historical log clustering of block 103. The captured log may be associated with the historical log cluster based on the captured log's similarity to the historical logs in the historical log cluster. Such similarity may be determined, for example, based on a cluster similarity score that indicates the degree of similarity between the captured log and the representative historical logs associated with each cluster. The captured log may, for example, be associated with the cluster having the representative historical logs that result in the highest cluster similarity score for the captured log. In other implementations, the similarity between the captured log and an average historical log construct representative of the historical logs within the cluster, or some other similarity metric, may be used. In effect, the association of the captured log with a cluster of historical logs is indicative that the captured log would be clustered with the historical logs in the cluster if the captured log were one of the historical logs. The captured logs are not, however, actually added to the cluster (or, if they are, they are added in a way that permits them to be segregated from the historical logs in the cluster). In some implementations, a captured log may be associated with a cluster based on similarities of the captured log to a subset of historical logs in the cluster, e.g., similarity to historical logs less than X months old. If the clustering of historical logs of block 103 is not performed, then block 110 may be omitted as well.

In block 112, the historical logs in the cluster with which the captured log is associated are compared against the captured log to, in block 114, generate similarity scores that act as a metric of how similar each historical log in the cluster is to the captured log. In some implementations, similarity scores may only be generated for a subset of the historical logs in the cluster, e.g., the most recent X historical logs or historical logs less than Y months old.

In block 116, the similarity scores may be compared against a mutation modification threshold and if the similarity score for a particular historical log/captured log pair meets and/or exceeds the mutation modification threshold, the technique may proceed to block 122. In block 122, fuzzing parameters affecting the fuzzing performed in block 104 for subsequent input seed fuzzing may be modified or biased to place an increased emphasis on fuzzing aspects of the input seed that correlate with aspects of the input seed that were fuzzed to produce the fuzzed input seed that resulted in the captured log having a similarity score with respect to the historical log that met or exceeded the mutation modification threshold. After the biasing of block 122 is done, the technique may return to block 104 and further fuzzed input seeds may be created. Alternatively, the technique may return to block 102 to utilize a new input seed, although the fuzzing in block 104 may still take into account any fuzzing parameter biasing that may have occurred in block 122. The fuzzing parameter biasing/modification technique of block 120 is discussed in more detail later in this disclosure.

In some implementations, a random number may be added to the similarity score prior to determining if it meets or exceeds the mutation modification threshold. For example, if the similarity score is a number between 0 and 1, a random number in the range of 0 to 0.15 might be added to each similarity score prior to determining if the similarity score meets or exceeds the mutation modification threshold. This may inject an element of randomness with regard to which fuzzed input seeds may influence the generation of future fuzzed input seeds. Such randomness may allow for fuzzing variations that may have generated a lower similarity score, i.e., a similarity score below the mutation modification threshold, previously to still be tried again even though their similarity score is below the mutation modification threshold. Thus, exploring such fuzzing variations, while not prioritized to the extent that the exploration of fuzzing variations that produce similarity scores that meet or exceed the mutation modification threshold, may still be explored and given a chance to influence future fuzzing exploration.

Additionally or alternatively, the fuzzed input seeds that resulted in similarity scores with respect to historical logs that meet and/or exceed the mutation modification threshold may be used as new input seeds, i.e., may themselves be fuzzed to produce new fuzzed input seeds.

In addition to the comparison of the similarity scores to the mutation modification threshold performed in block 116, an additional comparison of the similarity scores to a alarm threshold may be performed in block 118. The alarm threshold may be greater than or equal to the mutation modification threshold and, in many implementations, may be substantially greater than the mutation modification threshold. For example, the mutation modification threshold may be a 50% or higher similarity score, whereas the alarm threshold may be a 99% or higher similarity score.

If the similarity score for a historical log/captured log pair meets and/or exceeds the alarm threshold, the technique may proceed to block 120, where an alarm may be generated. Generally speaking, a historical log/captured log pair that meets and/or exceeds the alarm threshold will also exceed the mutation modification threshold—thus both block 120 and block 122 may be performed.

The alarm may alert a human operator to the fact that a captured log has been obtained that has a high similarity score, e.g., above the alarm threshold. The alarm may also indicate further information pertaining to the historical log and captured log that produced the similarity score that produced the alarm, e.g., verbatim copies of the captured log and/or the historical logs, some or all of the data from the captured log and/or the historical log, the requests that produced the captured log and/or the historical log, the fuzzed input seed on which the request that resulted in the captured log was based, and the input seed that was mutated to produce the fuzzed input seed. The alarm may further include information identifying how the input seed was mutated, e.g., what changes were made to the input seed, which aspects of the input seed were mutated, etc.

In some implementations, multiple captured log/historical log pairs having similarity scores meeting and/or exceeding the alarm threshold may be identified and then indicated via a single alarm.

The alarm may allow a human operator to easily identify historical logs that are highly similar to captured logs generated in response to requests including data from fuzzed input seeds. Generally speaking, many malicious attacks involve creative elements that make it very difficult to attempt, in an automated fashion, to detect when malicious access to a production system is being attempted. The technique of FIG. 1 may allow a human operator to use the alarmed historical logs/captured logs in a variety of ways that may compensate for a lack of specific foreknowledge of the creative elements in an attack.

First, if there is a high degree of similarity between a captured log and a historical log, then there is likely a high degree of similarity between the request that used data from the fuzzed input seed and produced the captured log and the request that produced the historical log, i.e., the inputs associated with the historical log may be highly similar to the inputs derived from the fuzzed input seed. If multiple historical logs have similarity scores with respect to a captured log that are above the alarm threshold, this may be indicative of a brute-force probing attack by a malicious entity.

Second, in cases where the input seed used to produce the fuzzed input seed was initially constructed so as to be representative of a potential "malicious" input, historical logs having a high similarity may indicate that a malicious entity was probing the production system in a manner similar to that represented in the input seed/fuzzed input seed.

Third, even in cases where the fuzzed input seed associated with the captured log having a high-similarity score ultimately proves to be non-malicious, such high similarities may provide valuable insight as to the types of requests that are typically received by the production system, allowing the system operator to adjust various parameters, e.g., the input seed to either further explore such inputs or to de-emphasize such inputs.

One of the chief problems that confronts system operators with systems that are operating in the third state is that the system operator cannot know for a certainty whether or not they are in the third state. Since the system operator is unaware that they are being attacked and unaware of the potential vulnerability, there is very little that the system operator can do. However, by using the technique described herein, a system operator may be able to gain insight as to past potentially malicious attacks against the system and may thus be able to determine if a vulnerability was located by a malicious entity. Armed with this knowledge, the system operator may be able to move to the second state and then the first state.

Even if no specific vulnerability is detected using the techniques described herein, a system operator utilizing these techniques may at least gain insight as to the types of requests that are being made of the system and may focus their efforts on exploring input seeds and fuzzed input seeds (as well as the mutations of input seeds that produce the fuzzed input seeds) that appear to generate captured logs with high similarity to historical logs.

As discussed above, the input seed fuzzing of block 104 may be somewhat constrained so as to emphasize certain mutation strategies over others, i.e., not be purely random. For example, each input seed may have a number of aspects, and certain aspects may be of more interest than others from a security perspective. For example, each input seed may include a number of different variables that are supplied to the test system as part of a request to the test system. Each of these variables may be an aspect of the input seed. Additionally, each variable may have a data type associated with it, e.g., date, string, Boolean, etc.; the data type of each variable may be a further aspect of the input string. Furthermore, each variable may have various other properties associated with it, e.g., max string length, minimum string length, acceptable date range, etc.; these properties may also serve as aspects of the input seed.

It is to be understood that an input seed may have as little as one aspect that may be subject to mutation, or may have a plurality of aspects that are subject to mutation. An input seed with a low number of mutable aspects may be simple to mutate, but a large portion of the fuzzed input seeds that are produced by fuzzing that single aspect of the input seed may be of low value since they may produce captured logs that have low similarity to any of the historical logs used. Conversely, an input seed with a high number of mutable aspects may be more complicated to mutate but may allow for finer control of the fuzzed input seeds and thus allow the user to adjust the input seed mutation to avoid fuzzed input seeds that generate captured logs having low similarity to any of the historical logs.

Figure 2:
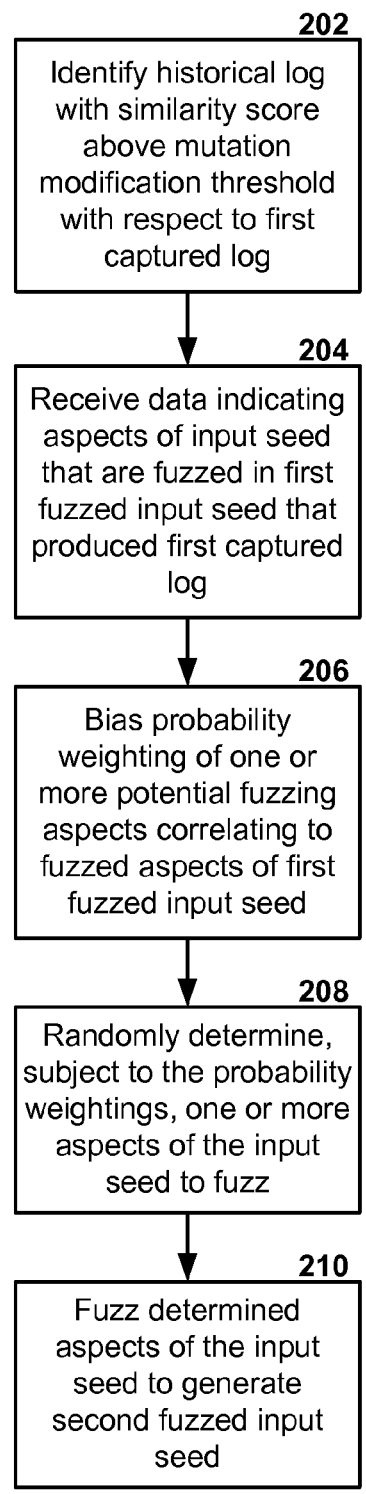
FIG. 2 depicts a flow chart of a technique for modifying the fuzzing behavior of a log-sensitive fuzzing technique.

FIG. 2 depicts a flow chart of a technique for modifying the fuzzing behavior of a log-sensitive fuzzing technique.

In block 202, a historical log/captured log pair with a similarity score meeting or exceeding the mutation modification threshold may be identified. In block 204, data may be received or obtained indicating which aspects of an input seed were mutated or fuzzed to arrive at the fuzzed input seed that ultimately resulted in the captured log.

In block 206, probability weightings associated with the aspects that were indicated as being mutated in block 204 may be modified or biased, e.g., increased. In some implementations, other probability weightings associated with aspects that were not indicated as being mutated (or indicated as not being mutated) may also be modified or biased, e.g., decreased.

In block 208, one or more aspects of an input seed may be selected for mutation based on the probability weightings of the various aspects. For example, for mutation of a given input seed, a determination may be made with respect to each mutable aspect of the input seed as to whether or not that aspect will be mutable. Such a determination may be a function of the probability weighting of the aspect in question, e.g., if an aspect has a probability weighting of 0.2, then, on average, in 2 out of 10 mutations of that input seed, that aspect will be one of the aspects that is mutated. In some implementations, only one aspect may be mutated in each mutation of an input seed, although in other implementations, one or more aspects may be mutated for each mutation of an input seed.

The mutations actually performed on an input seed may include random mutation of a selected aspect of the input seed, e.g., random mutation of a text field value, or mutation of some other characteristic of the selected aspect, e.g., altering the length of a text field through byte padding. Other mutations that may be performed on an input seed may include adjusting various byte values, adding escape or unescape characters to strings, rearranging the order of headers and/or footers and/or fields, etc. The mutations may be modeled after techniques known to be employed by attackers attempting to gain entrance to computing systems, e.g., if there is a known program that is used by attackers to automate an attack on a production system and that program mutates inputs in a particular way, then a similar mutation strategy may be one of the mutation options employed during the fuzzing of FIG. 1 and FIG. 2.

In block 210, the selected or determined aspects of the input seed may be mutated to produce a fuzzed input seed. By using the technique outlined in FIG. 2, the mutation of input seeds may be modified to emphasize selected mutation aspects, e.g., mutation aspects that have produced captured logs with high similarity to historical logs. In this manner, the historical log space may be more efficiently explored, allowing a human using the technique (or results thereof) to focus effort on fuzzed input seeds that are more representative of previous potential inputs that resulted in the historical logs.

In some implementations, the aspects of an input seed that may be mutated may include field values, field order, or field inclusion/omission. For example, an input seed might include a plurality of input fields that may be provided to a web services provider in a web service request and that may be expected in a particular order. The values of such fields may be mutated, the order in which the data of those fields are presented in request may be mutated, and/or one or more of such fields may be omitted (or included) from fuzzed input seed to fuzzed input seed.

As discussed above, some production systems may, in ordinary use, produce on the order of hundreds of thousands or millions of logs per hour, resulting in datasets of historical logs numbering in the billions or trillions in relatively short periods of time. Producing a similarity score for each of billions of historical logs and each captured log may be extremely computation-intensive, and many of the resulting similarity scores may be well below any threshold used to alarm or to modify or bias the fuzzing technique. To reduce the number of similarity score computations that may be performed, a clustering technique, as outlined above, may be used to cluster the historical logs into groups of similarly-structured historical logs.

Figure 3:
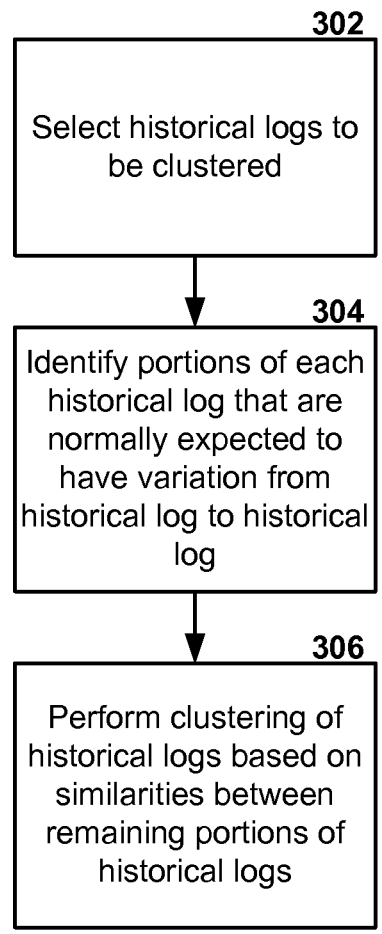
FIG. 3 depicts a flow chart of a technique for clustering historical logs.

FIG. 3 depicts a flow chart of a technique for clustering historical logs. As discussed above, a variety of standard clustering techniques may be used to group the historical logs. Various steps may be used to enhance the resulting clustering, however; FIG. 3 represents some such steps.

In block 302, an initial population of historical logs may be selected, e.g., the most recent X months' worth of historical logs generated by a production system. Each historical log may be separable into a plurality of portions that generally correspond to one of three categories. A first category may be the portions of a historical log that remain static between multiple historical logs of that type, e.g., field names for data that is included in every such historical log. A second category may be the portions of a historical log that vary from historical log to historical log depending on the inputs in the requests that caused the historical logs to be generated, e.g., field values in a historical log that are derived from an input. If the same inputs are used for a plurality of requests, the portions of the resulting historical logs in the second category will be the same. A third category may be the portions of the historical logs that may vary from historical log to historical log independent of the input values passed by the request, e.g., timestamps reflecting the date and time at which the historical log was generated, session IDs, reflecting internal session identifiers for the connection through which the requests for the historical logs were received, etc. Even if the same inputs are used for a plurality of requests, the portions of the resulting historical logs in the third category may be different. In block 304, portions of the historical logs falling within the third category may be identified.

In block 306, the historical logs may be clustered based on similarities between portions of the historical logs falling into the first and second categories, but not the third category. In some implementations, the historical logs may be clustered based only on similarities between the portions of the historical logs in the first category.

Such clustering techniques may allow for a more accurate clustering of historical logs.

Another challenge that may be encountered in the techniques described herein is that of differentiating historical logs, i.e., logs resulting from requests with third-party inputs during normal operation of a production system, from captured logs, i.e., logs resulting from requests using fuzzed input seed data, when requests based on fuzzed input seeds are provided to the production system, e.g., the test system and the production system are one and the same.

Figure 4:
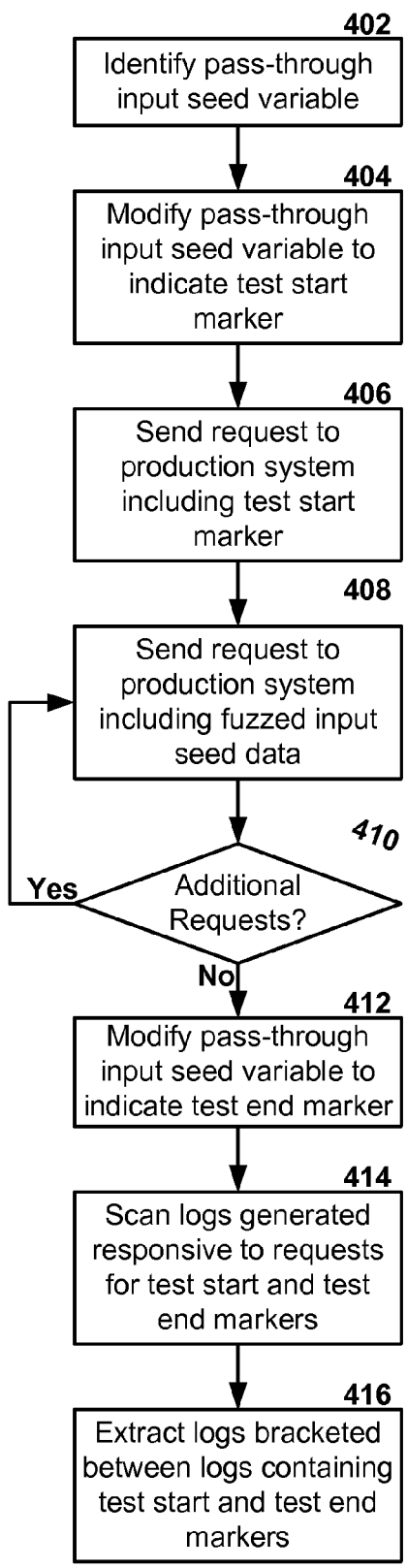
FIG. 4 depicts a flow chart of a technique for isolating captured logs from a system.

FIG. 4 depicts a flow chart of a technique for isolating captured logs from a production system. In block 402, a portion of an input seed, e.g., an input seed variable, may be identified as being a "pass-through" variable, i.e., data within the variable may be replicated verbatim (or may be extracted in some fashion) within a captured log generated responsive to a request based on the input seed.

In block 404, an input seed may be modified such that the pass-through variable contains a marker, referred to herein as the test start marker, indicating the start of a fuzzed input seed request block. In block 406, a request may be sent to a production system with data indicating the test start marker.

In block 408, a further request may be sent to the production system including data from a fuzzed input seed. In block 410, a determination may be made as to whether additional requests based on additional fuzzed input seeds should be made. If so, then the technique may return to block 408. If not, the technique may continue to block 412.

In block 412, an input seed may be modified such that the pass-through variable (or another pass-through variable) contains a marker, referred to herein as a test end marker, indicating the end of the fuzzed input seed request block. In block 414, a request may be sent to the production system with data indicating the test end marker.

In block 416, the logs generated by the production system may be scanned to locate logs having the test start and test end markers. In block 418, the logs bracketed between the logs containing the test start and the test end markers may be extracted and/or isolated and classified as captured logs (the logs not identified as being between test start and test end markers may be classified as historical logs).

It may be necessary to delay or prevent requests not including data from fuzzed input seeds from being provided to the production system in between providing the production system with the request including the test start marker and providing the production system with the request including the test end marker in order to prevent historical logs from being mistakenly identified as captured logs.

In a further variation, the test start marker and/or test end marker may be combined with requests including data derived from a fuzzed input seed. As an example, a test marker may be inserted into a pass-through variable portion of every fuzzed input seed and request including data therefrom. In this variation, every log that is produced responsive to a request featuring data from a fuzzed input seed may include the test marker and may be later extracted from the larger pool of historical records and identified as a captured log. Of course, in such variations, the pass-through variable portion of the fuzzed input seed may need to be protected against fuzzing to prevent the test marker from being altered into an unrecognizable state.

In some implementations, both types of markers may be used (test start/end markers and test markers). The test start marker and test end marker may be computationally simple to detect, and may be used to turn on and off a module that performs a more computationally rigorous review of the captured logs to see if test markers are present indicating that a particular captured log should be associated with a particular fuzzed input seed.

The techniques discussed above with respect to FIG. 4 may be of particular use when utilizing production systems that may be constructed without any special interfaces for accommodating the techniques described herein. In implementations where some degree of customization of the production system may be performed to accommodate the techniques described herein, a more integrated approach may be pursued.

Figure 5:
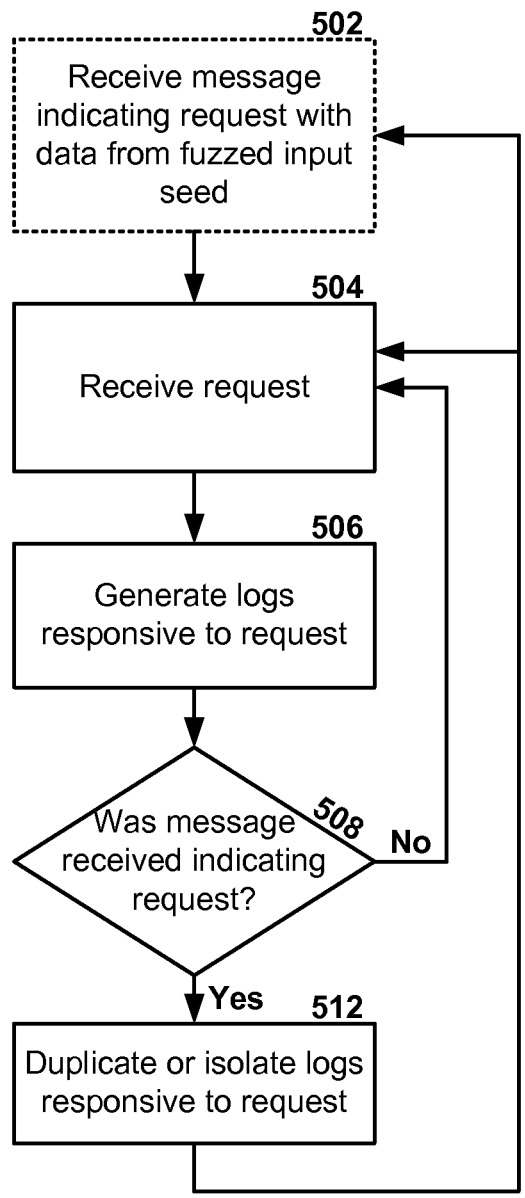
FIG. 5 depicts a flow chart of another technique for isolating captured logs from a system.

FIG. 5 depicts a flow chart of another technique for isolating captured logs from a system. The technique outlined in FIG. 5 may be used with production systems that may include features that allow certain requests to be designated as being "test" requests (as opposed to normal-use requests). For example, a production system may provide an interface for receiving messages indicating that a particular request is about to be received by the production system. The production system may be configured to identify the particular request based on the message, and then duplicate or isolate the logs produced by the production system in response to the particular request. These isolated or duplicated logs may be treated as captured logs and may be associated in a database with whatever input seed, e.g., fuzzed input seed, was reflected in the particular request.

For example, in block 502, a message may be received by the production system (or sent to the production system) indicating a particular request with data from a fuzzed input seed that will be provided to the production system. In block 504, a request may be received by the production system and, in block 506, logs may be generated responsive to the particular request.

In block 508, the request may be evaluated to determine if the message received in block 502 indicated the request, e.g., the message may include the text of the request, and the request may be compared against text of the request in the message to determine if there is a match. Block 508 may also be performed prior to block 506.

If the message of block 502 indicates the request of block 504, then any logs that are or were generated as a result of the request of block 504 being received by the production system may be identified as captured logs and may be isolated from the logs produced responsive to requests not identified by a message such as that received in block 502, i.e., historical logs, in block 512. After block 512, the technique may return to block 502 or block 504

If the message of block 502 does not indicate the request of block 504, then the technique may return to block 504 and another request may be received. This allows multiple requests that are not indicated by the message of block 502 to be received and processed before the "test" request is received and processed. In systems with high through-put, even if the message and the indicated request are sent simultaneously, there may be intervening requests received between the message and the indicated request.

In some implementations, the request itself may serve as the message, i.e., the request may include data indicating that it is a "test" request, as well as other information that may allow the request to be linked to a particular input seed. The production system may be configured to isolate any logs resulting from such requests and treat them as captured logs rather than historical logs.

As discussed above, input seeds may be provided by a system designer or other entity that may provide a "representative" input seed that may then be fuzzed. Another technique that may be used to provide an input seed is to mine the historical logs for data that may be used to populate the data fields of an input seed with "real" data. This may be used, for example, in conjunction with a functional specification that defines which inputs may be need to be provided to the production system in a request.

Figure 6:
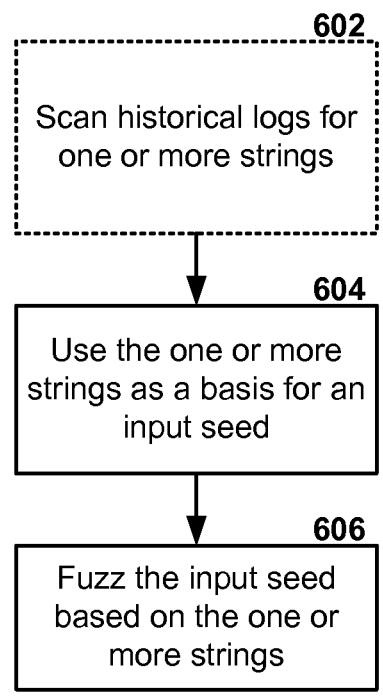
FIG. 6 depicts a flow chart of a technique for producing an input seed based on historical logs.

FIG. 6 depicts a flow chart of a technique for producing an input seed based on historical logs. In block 602, one or more historical logs may be scanned for one or more strings or other data. Such strings or other data may be extracted from one or more different historical logs and used to define an input seed in block 604. In block 606, the input seed may be fuzzed as discussed earlier in this disclosure. Such a technique may allow fuzzed input seeds resulting in captured logs having high similarity scores with respect to historical logs to be generated at a much earlier point in time than they otherwise might, thus potentially accelerating the exploration of other fuzzed inputs (when the technique also involves modified/biased seed input fuzzing such as discussed with respect to FIG. 2) that may, in general, have high similarity scores with respect to some of the historical logs.

Figure 7:
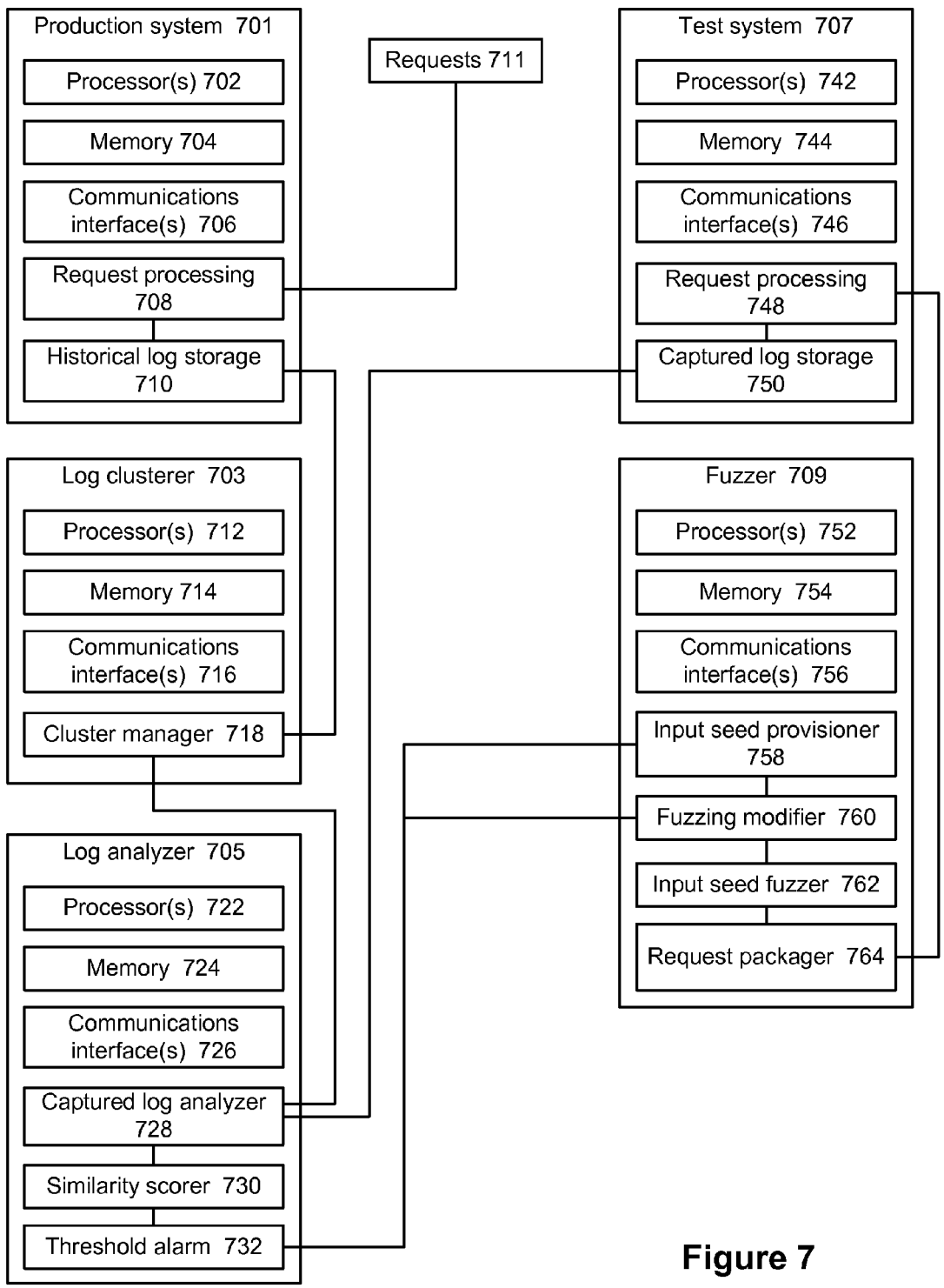
FIG. 7 depicts a high-level system schematic of systems that may be used to implement the techniques discussed herein.

FIG. 7 depicts a high-level block diagram of one system that may be used to perform the techniques described herein. Five separate systems are depicted in FIG. 7: a production system 701, a test system 707, a log clusterer 703, a fuzzer 709, and a log analyzer 705. It is to be understood that the functionality provided by these various systems may, in some implementations, be combined into a lesser number of systems or split out further into a greater number of systems. For example, as discussed earlier herein, the production system 701 and the test system 707 may be the same system. In some implementations, the log clusterer 703, the log analyzer 705, and the fuzzer 709 may all be provided by the same system. All of these potential implementations providing substantially the same functionality as is discussed below with respect to FIG. 7 are to be understood as being within the scope of this disclosure.

The production system 701 may include one or more processors 702 communicatively coupled with a memory 704 and one or more communications interfaces 706. The memory 704 may store computer-executable instructions for controlling the one or more processors 702 and the one or more communications interfaces 706 to provide request processing 708 functionality responsive to requests 711 received via the one or more communications interfaces 706. The memory may further store computer-executable instructions for controlling the one or more processors 702, and potentially the one or more communications interfaces 706, to store logs resulting from the request processing 708 in historical log storage 710.

The log clusterer 703 may similarly include one or more processors 712 communicatively coupled with a memory 714 and one or more communications interfaces 716. The memory 714 may store computer-executable instructions for controlling the one or more processors 712 and the one or more communications interfaces 716 to provide a cluster manager 718 that may cluster the historical logs as discussed with respect to FIG. 1 and/or FIG. 3. Historical logs may be passed or identified to cluster manager 718, which may process the historical logs into clusters based on similarity between the historical log events.

The fuzzer 709 may also similarly include one or more processors 752 communicatively coupled with a memory 754 and one or more communications interfaces 756. The memory 754 may store computer-executable instructions for controlling the one or more processors 752 and the one or more communications interfaces 756 to provide an input seed provisioner 758. The input seed provisioner 758 may provide an interface for receiving input seeds, e.g., a mechanism allowing a user to import seed inputs from an existing request, manual entry of seed inputs, or other mechanism.

The fuzzer 709 may also include a fuzzing modifier 760 and an input seed fuzzer 762. The fuzzing modifier 760 may modify the input seed fuzzer 762 to emphasize certain input seed aspects in fuzzing performed by the input seed fuzzer 762, e.g., in a manner similar to that shown in FIGS. 1 and 2. After the input seed fuzzer 762 produces a fuzzed input seed, the fuzzed input seed may be provided to a request packager 764, if needed, to transform the fuzzed input seed into a request that may be sent to a request processing 748 routine in the test system 707 to produce captured logs.

The test system 707 may also similarly include one or more processors 742 communicatively coupled with a memory 744 and one or more communications interfaces 746. The memory 746 may store computer-executable instructions for controlling the one or more processors 742 and the one or more communications interfaces 746 to provide request processing 748 functionality in response to requests from the fuzzer 709. Such request processing 748 functionality may be substantially similar to the request processing 708 functionality and, in implementations where the test system 707 and the production system 701 are the same, may be identical or nearly identical. Captured logs resulting from the requests provided to the request processing 748 may be stored in captured log storage 750.

The log analyzer 705 may also similarly include one or more processors 722 communicatively coupled with a memory 724 and one or more communications interfaces 726. The memory 726 may store computer-executable instructions for controlling the one or more processors 722 and the one or more communications interfaces 726 to provide captured log analyzer 728, which may obtain captured logs from the captured log storage 750 and the historical log storage 710. The captured log analyzer 728 may associate each captured log with historical log cluster managed by the cluster manager 718 based on the captured logs' similarity to the historical log cluster. The similarity scorer 730 may score the captured logs and historical logs in an associated cluster for similarity and a threshold alarm 732 may provide fuzzing modification parameters to the fuzzing modifier 760 and/or may provide new input seeds based on fuzzed input seeds to the input seed provisioner 758. The threshold alarm 732 may also provide alerts to a human operator indicating various high-similarity captured log/historical log pairs.

Some of the above functionality may be omitted or added to depending on particular implementations. For example, if clustering is not used, then the log clusterer may be omitted.

It should be noted that, despite any references to particular computing paradigms and software tools herein, computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the components or operations described herein may be implemented as software code to be executed by a processor using any suitable computer language such as Java, C++ or Perl, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible device such as a client device as described above or provided separately from other devices. Any such computer-readable medium may reside on or within a single computing device or an entire computer system, and may be among other computer-readable media within a system or network. A computing device such as the client devices described above may include a monitor, printer, or other suitable display for providing any of the results mentioned herein to a user.

Examples of various implementations have been illustrated in the accompanying drawings and described further in the text above. It will be understood that the discussion herein is not intended to limit the claims to the specific implementations described. On the contrary, it is intended to cover alternatives, modifications, and equivalents as may be included within the spirit and scope of the invention as defined by the appended claims. In the preceding description, numerous implementation-specific details have been set forth in order to provide a thorough understanding of the present invention. The present invention may be practiced without some or all of these implementation-specific details. In other instances, well-known process operations have not been described in detail in order not to unnecessarily obscure the present invention.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present disclosure should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the disclosure.

What is claimed is:

1. A non-transitory, machine-readable medium storing computer-executable instructions for controlling one or more processors to:
   receive an input seed for a production system;
   fuzz the input seed to produce a fuzzed input seed different from the input seed;
   provide a current request to a test system including data from the fuzzed input seed;
   obtain a captured log, wherein:
      the captured log is produced as a result of actions taken by the test system in response to receiving the current request,
      the captured log is separate from a response provided by the test system to a requesting entity that provided the current request, and
      the captured log is of a type normally produced by the production system during normal operation;
   obtain historical logs responsive to previous requests to the production system, wherein:
      the historical logs are produced as a result of actions taken by the production system in response to receiving the previous requests, and
      the historical logs are of a type or types normally produced by the production system during normal operation;
   generate a similarity score for each of a plurality of first historical logs of the historical logs, each similarity score based at least in part on a comparison between the corresponding first historical log and the captured log;
   repeat the operations of fuzzing the input seed, providing a current request, obtaining a captured log, and generating a similarity score for one or more other fuzzed input seeds; and
   indicate the first historical logs where the similarity score meets or traverses an alarm threshold.

2. The non-transitory, machine-readable medium of claim 1, storing further computer-executable instructions for controlling the one or more processors to:
   cluster the historical logs into clusters, wherein:
      each historical log is clustered in a particular cluster based on that historical log's similarity to one or more representative historical logs associated with that particular cluster, and
      the first historical logs are grouped in a first cluster of the clusters; and associate the captured log with the first cluster based on a cluster similarity score between the captured log and the first cluster.

3. The non-transitory, machine-readable medium of claim 1, wherein the computer-executable instructions for controlling the one or more processors to fuzz the input seed cause the one or more processors to select one or more different aspects of the input seed to mutate from a plurality of different aspects of the input seed based on a probability weighting associated with each aspect.

4. The non-transitory, machine-readable medium of claim 3, wherein the plurality of aspects of the input seed include one or more aspects selected from the group consisting of: field values, field order, and inclusion/omission status of fields.

5. The non-transitory, machine-readable medium of claim 1, storing further computer-executable instructions for controlling the one or more processors to:
indicate the fuzzed input seed that resulted in the captured log that produced the similarity score that met or exceeded the alarm threshold when data from the fuzzed input seed was provided to the test system by the current request.

6. A computer-implemented method comprising:
obtaining a fuzzed input seed that is a mutation of at least part of an input seed for a production system;
obtaining a captured log from a test system, the captured log being obtained responsive to a current request provided to the test system and that contained data from the fuzzed input seed;
obtaining historical logs from the production system, the historical logs not responsive to the current request and responsive to other, previous requests; and
generating a similarity score for each of a plurality of first historical logs of the historical logs, each similarity score based at least in part on a comparison between the corresponding first historical log and the captured log.

7. The method of claim 6, further comprising:
clustering the historical logs into clusters, wherein:
each historical log is clustered in a particular cluster based on that historical log's similarity to one or more representative historical logs associated with that particular cluster, and
the first historical logs are grouped in a first cluster of the clusters; and
associating the captured log with the first cluster based on a cluster similarity score between the captured log and the first cluster.

8. The method of claim 6, wherein the obtaining the fuzzed input seed includes:
selecting one or more different aspects of the input seed to mutate from a plurality of different aspects of the input seed based on a probability weighting associated with each aspect; and
mutating the one or more selected different aspects.

9. The method of claim 8, wherein the plurality of aspects of the input seed include one or more aspects selected from the group consisting of: field values, field order, and inclusion/omission status of fields.

10. The method of claim 6, further comprising:
repeating the operations of obtaining a fuzzed input seed, obtaining a captured log from the test system, and generating a similarity score for a plurality of additional fuzzed input seeds each based on a different mutation of the input seed.

11. The method of claim 10, further comprising:
indicating the first historical log or logs where the similarity score meets or exceeds an alarm threshold for a particular fuzzed input seed.

12. The method of claim 11, further comprising:
indicating the particular fuzzed input seed that, when data from the fuzzed input seed was provided to the test system by the current request, resulted in the captured log that produced the similarity score that met or exceeded the alarm threshold.

13. The method of claim 10, further comprising:
indicating the first historical logs where the similarity score meets or exceeds an alarm threshold for a particular fuzzed input seed;
identifying the fuzzed input seeds that resulted in captured logs having a similarity score that meets or exceeds a mutation modification threshold lower than the alarm threshold; and
modifying a probability weighting associated with one or more aspects of the input seed that are mutable to produce fuzzed input seeds based on the aspects of the input seed that were mutated to produce the identified fuzzed input seeds.

14. The method of claim 13, wherein a random number is added to the similarity score prior to determining if the similarity score met or exceeded the mutation modification threshold.

15. A system comprising:
one or more processors; and
one or more memories, the one or more memories communicatively linked to the one or more processors and storing computer-executable instructions for controlling the one or more processors to:
obtain a fuzzed input seed that is a mutation of at least part of an input seed for a production system;
obtain a captured log from a test system, the captured log obtained responsive to a current request provided to the test system and that contained data from the fuzzed input seed;
obtain historical logs for the production system, the historical logs not responsive to the current request and responsive to other, previous requests; and
generate a similarity score for each of a plurality of first historical logs of the historical logs, each similarity score based at least in part on a comparison between the corresponding first historical log and the captured log.

16. The system of claim 15, the one or more memories storing further computer-executable instructions for controlling the one or more processors to:
cluster the historical logs into clusters, wherein:
each historical log is clustered in a particular cluster based on that historical log's similarity to one or more representative historical logs associated with that particular cluster, and
the first historical logs are grouped in a first cluster of the clusters; and
associate the captured log with the first cluster based on a cluster similarity score between the captured log and the first cluster.

17. The system of claim 15, the one or more memories storing further computer-executable instructions for controlling the one or more processors to obtain the fuzzed input seed by:

selecting one or more different aspects of the input seed to mutate from a plurality of different aspects of the input seed based on a probability weighting associated with each aspect, and mutating the one or more selected different aspects.

18. The system of claim 17, wherein the plurality of aspects of the input seed include one or more aspects selected from the group consisting of: field values, field order, and inclusion/omission status of fields.

19. The system of claim 15, the one or more memories storing further computer-executable instructions for controlling the one or more processors to repeatedly:

obtain the fuzzed input seed, obtain the captured log from the test system, and generate the similarity score, wherein the repetitions are performed for a plurality of different fuzzed input seeds.

20. The system of claim 19, the one or more memories storing further computer-executable instructions for controlling the one or more processors to:

indicate the first historical log or logs where the similarity score meets or exceeds an alarm threshold for a particular fuzzed input seed.

21. The system of claim 20, the one or more memories storing further computer-executable instructions for controlling the one or more processors to:

indicate the particular fuzzed input seed that, when data from the fuzzed input seed was provided to the test system by the current request, resulted in the captured log that produced the similarity score that met or exceeded the alarm threshold.

22. The system of claim 19, the one or more memories storing further computer-executable instructions for controlling the one or more processors to:

indicate the first historical logs where the similarity score meets or exceeds an alarm threshold for a particular fuzzed input seed;

identify the fuzzed input seeds that resulted in captured logs having a similarity score that meets or exceeds a mutation modification threshold lower than the alarm threshold; and modify a probability weighting associated with one or more aspects of the input seed that are mutable used to produce fuzzed input seeds based on the aspects of the input seed that were mutated to produce the identified fuzzed input seeds.

23. The system of claim 22, wherein a random number is added to the similarity score prior to determining if the similarity score met or exceeded the mutation modification threshold.

* * * * *